United States Patent
Brake et al.

(10) Patent No.: US 11,151,117 B2
(45) Date of Patent: Oct. 19, 2021

(54) INCREASING THE ACCURACY OF A STATEMENT BY ANALYZING THE RELATIONSHIPS BETWEEN ENTITIES IN A KNOWLEDGE GRAPH

(71) Applicant: International Business Machines Corporation, Armonk, NY (US)

(72) Inventors: Kyle M. Brake, Dublin, OH (US); Keith G. Frost, Delaware, OH (US); Stephen A. Boxwell, Columbus, OH (US); Stanley J. Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 16/049,501

(22) Filed: Jul. 30, 2018

(65) Prior Publication Data
US 2020/0034465 A1     Jan. 30, 2020

(51) Int. Cl.
*G06F 16/23* (2019.01)
*G06F 16/332* (2019.01)
*G06F 16/33* (2019.01)

(52) U.S. Cl.
CPC ...... *G06F 16/2365* (2019.01); *G06F 16/3323* (2019.01); *G06F 16/3329* (2019.01); *G06F 16/3344* (2019.01)

(58) Field of Classification Search
CPC ............. G06F 16/3323; G06F 16/3344; G06F 16/2365
See application file for complete search history.

(56) References Cited

U.S. PATENT DOCUMENTS

| | | |
|---|---|---|
| 5,675,159 A | 10/1997 | Deirchow |
| 6,847,980 B1 | 1/2005 | Benitez et al. |
| 7,483,923 B2 | 1/2009 | Novik |

(Continued)

FOREIGN PATENT DOCUMENTS

CN          106934012          7/2017

OTHER PUBLICATIONS

U.S. Appl. No. 15/815,746, filed Nov. 17, 2017, IBM.
(Continued)

*Primary Examiner* — Charles E Lu
(74) *Attorney, Agent, or Firm* — Andrew Aubert (57) ABSTRACT

A cognitive system improves the accuracy of a natural language statement by analyzing relationships between entities in a knowledge graph for the statement. A natural language processing engine extracts entities and relationships in the statement, and a yes/no pipeline gauges the accuracy of the statement. If a statement is deemed inaccurate, the knowledge graph is used to identify a predominant relationship between certain entities, and a candidate phrase representing the predominant relationship is generated and presented to the user as a suggested replacement for a target phrase in the statement representing the relationship. The yes/no pipeline computes an accuracy score for the statement, and the statement is deemed inaccurate when the score is below a programmable threshold. The assertiveness of the system can be tuned by requiring the accuracy score of a proposed modified statement to be greater than the score of the original statement plus some tuning factor.

19 Claims, 4 Drawing Sheets

(56) References Cited

U.S. PATENT DOCUMENTS

| | | | |
|---|---|---|---|
| 8,156,155 B1* | 4/2012 | Yu | G06F 16/288 707/802 |
| 8,443,005 B1* | 5/2013 | Goldman | G06Q 50/01 707/798 |
| 9,081,482 B1* | 7/2015 | Zhai | G06F 3/0237 |
| 9,665,661 B2 | 5/2017 | Bose et al. | |
| 10,657,204 B2 | 5/2020 | Brake | |
| 2005/0125217 A1* | 6/2005 | Mazor | G06F 40/232 704/1 |
| 2008/0133671 A1 | 6/2008 | Kalaboukis | |
| 2011/0307435 A1 | 12/2011 | Overell | |
| 2012/0078826 A1* | 3/2012 | Ferrucci | G06N 7/005 706/12 |
| 2013/0159127 A1* | 6/2013 | Myslinski | G06Q 30/02 705/26.1 |
| 2016/0098037 A1 | 4/2016 | Zornio et al. | |
| 2016/0180218 A1* | 6/2016 | Clark | G06N 20/00 706/46 |
| 2018/0011903 A1 | 1/2018 | Abolhassani et al. | |
| 2019/0155963 A1 | 5/2019 | Boxwell | |

OTHER PUBLICATIONS

Green, Todd J., "Conceptual Modeling using the Entity-Relationship Model", Univ. of California at Davis, Dept. of Computer Science, Introduction to Database Systems, pp. 15-35 (Winter 2011).

Li, Xiaonan, et al., "Entity-Relationship Queries over Wikipedia", Proc. of 2nd Int'l. Workshop on Search and Mining User-generated Contents, pp. 21-28 (2010).

"Conceptual Modeling using the Entity-Relationship Model", UC Davis, Department of Computer Science, ECS-165A WQ' 11, 21 pgs.

Vernier, et al., "Method for Improving the Accuracy of a Statement using a Factoid Pipeline", U.S. Appl. No. 16/054,610, filed Aug. 3, 2018, 37 pgs.

* cited by examiner

INCREASING THE ACCURACY OF A STATEMENT BY ANALYZING THE RELATIONSHIPS BETWEEN ENTITIES IN A KNOWLEDGE GRAPH

BACKGROUND OF THE INVENTION

Field of the Invention

The present invention generally relates to natural language processing, and more particularly to a method of correcting inaccuracies in proposed natural language statements.

Description of the Related Art

A cognitive system (sometimes referred to as deep learning, deep thought, or deep question answering) is a form of artificial intelligence that uses machine learning and problem solving. Cognitive systems often employ neural networks although alternative designs exist. The neural network may be of various types. A feedforward neural network is an artificial neural network wherein connections between the units do not form a cycle. The feedforward neural network was the first and simplest type of artificial neural network devised. In this network, the information moves in only one direction, forward, from the input nodes, through the hidden nodes (if any) and to the output nodes. There are no cycles or loops in the network. As such, it is different from recurrent neural networks. A recurrent neural network is a class of artificial neural network where connections between units form a directed cycle. This creates an internal state of the network which allows it to exhibit dynamic temporal behavior. Unlike feedforward neural networks, recurrent neural networks can use their internal memory to process arbitrary sequences of inputs. A convolution neural network is a specific type of feedforward neural network based on animal visual perception, and so is particularly useful in processing image data. Convolutional neural networks are similar to ordinary neural networks but are made up of neurons that have learnable weights and biases.

As interactions between humans and computer systems become more complex, it becomes increasingly important to provide a more intuitive interface for a user to issue commands and queries to a computer system. As part of this effort, many systems employ some form of natural language processing. Natural language processing (NLP) is a field of computer science, artificial intelligence, and linguistics concerned with the interactions between computers and human (natural) languages. Many challenges in NLP involve natural language understanding, that is, enabling computers to derive meaning from human or natural language input, and others involve natural language generation allowing computers to respond in a manner familiar to a user. For example, a non-technical person may input a natural language question to a computer system, and the system intelligence can provide a natural language answer which the user can hopefully understand. Examples of an advanced computer systems that use natural language processing include virtual assistants, Internet search engines, and deep question answering systems such as the Watson™ cognitive technology marketed by International Business Machines Corp. Deep question answering systems can identify passages from text documents (corpora) and analyze them in various ways in order to extract answers relevant to a query; answers can be scored on a number of factors, and the highest score indicates the "best" answer. Models for scoring and ranking the answer are trained on the basis of large sets of question and answer pairs.

Different technologies can converge to provide resources for NLP, such as speech-to-text conversion (voice recognition). A user can say something to a computer system or cellphone, and the voice signal captured by the microphone is analyzed according to a particular human language or dialect to produce a text input or query in a computer-readable form.

NLP can also involve relationship extraction, i.e., detecting semantic relations within a set of artifacts, typically from text or XML documents. Relations include the subject, action and object within sentences and how they are correlated. One useful relationship extraction tool is the AlchemyAPI™ technology marketed by International Business Machines Corp. That tool provides an application interface (API) capable of parsing sentences into subject, action and object form and then adding additional semantic information such as entity extraction, keyword extraction, sentiment analysis and location identification. Relation extraction can be used to automatically identify buying signals, key events and other important actions.

Users often create a query or statement that has an error or inaccuracy. The error may be as simple as a spelling error which is easily corrected using standard substitutions, or may be more complicated such as a grammatical error which may be corrected using more extensive NLP. Sometimes a user may input into a yes/no pipeline (i.e., an algorithm which classifies the statement as either generally true or generally false) a natural language statement that is mostly true except for an entity within the statement. Prior art techniques are available, using cognitive systems, which find a different entity for substitution that can make the statement true, or otherwise have it make more sense.

SUMMARY OF THE INVENTION

The present invention in at least one embodiment is generally directed to a method of improving the accuracy of a natural language statement by receiving the natural language statement from a user in computer-readable form, extracting from the natural language statement a plurality of entities and at least one stated relationship using natural language processing wherein the stated relationship is between at least a first one of the entities and a second one of the entities and is based on a target phrase in the statement, determining that the natural language statement is inaccurate, identifying a predominant relationship between the first and second entities using a knowledge base wherein the predominant relationship is different from the stated relationship, generating a candidate phrase representing the predominant relationship using natural language processing, and presenting the candidate phrase to the user as a suggested replacement for the target phrase in the natural language statement. The predominant relationship can be identified by constructing a knowledge graph using the knowledge base wherein the knowledge graph includes a plurality of vertices representing the entities in the natural language statement and a plurality of edges representing relationships between the entities, and the predominant relationship is based on a statistically significant number of occurrences of a candidate relationship along a particular one of the edges of the knowledge graph. There could be multiple predominant relationships between the first and second entities, and multiple candidate phrases representing the multiple predominant relationships which are presented to the user as suggested replacements for the target phrase in the natural language statement. In one implementation the natural language statement is deemed to be inaccurate using a yes/no pipeline which uses cognitive analysis of the natural language statement based on information contained in the knowledge base. The yes/no pipeline can compute a numeric accuracy score representing an overall accuracy of the natural language statement, and the natural language statement is deemed inaccurate when the numeric accuracy score is below a programmable threshold. The assertiveness of the system can be tuned using a predetermined tuning value wherein the yes/no pipeline computes a second numeric accuracy score representing an overall accuracy of the candidate statement and the candidate statement is only recommended if the second numeric accuracy score exceeds a sum of the first numeric accuracy score and the tuning value. In some implementations the invention further takes appropriate action based on the particular application; for example if the natural language statement is a query intended for submission to a deep question answering system, the system can automatically replace the target phrase in the natural language statement with the candidate phrase to form a modified statement, and submit the modified statement to the deep question answering system.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Cognitive systems have become adept at recognizing and correcting certain inaccuracies in natural language statements, but one area which is still underserved is the interrelation of entities in a statement. For example, a user may input into a yes/no pipeline a natural language statement which is seemingly correct in all aspects, such as spelling, grammar and naming of entities, but expresses an incorrect relationship between two of the entities (based on facts or other presumptive truths). The yes/no pipeline might accordingly indicate that the statement is wrong without providing any assistance to the user on how to correct it. It would, therefore, be desirable to devise an improved method of correcting or otherwise improving the accuracy of a natural language statement in regard to one or more relationships between entities expressed in the statement. It would be further advantageous if the method could be applicable to a wide variety of electronic communications so as to improve overall user experience. These and other advantages are achieved in various implementations of the present invention in which entities and relationships are extracted from a natural language statement by a cognitive system, a particular relationship between specific entities is determined to be inaccurate, and a new relationship between those entities is found. When the new relationship is predominant, the system can offer to or automatically replace a target phrase of the statement representing the relationship with an alternate phrase. In some implementations the new relationship must predominate over the original relationship by a tuning factor to suggest replacement of the relationship.

Figure 1:
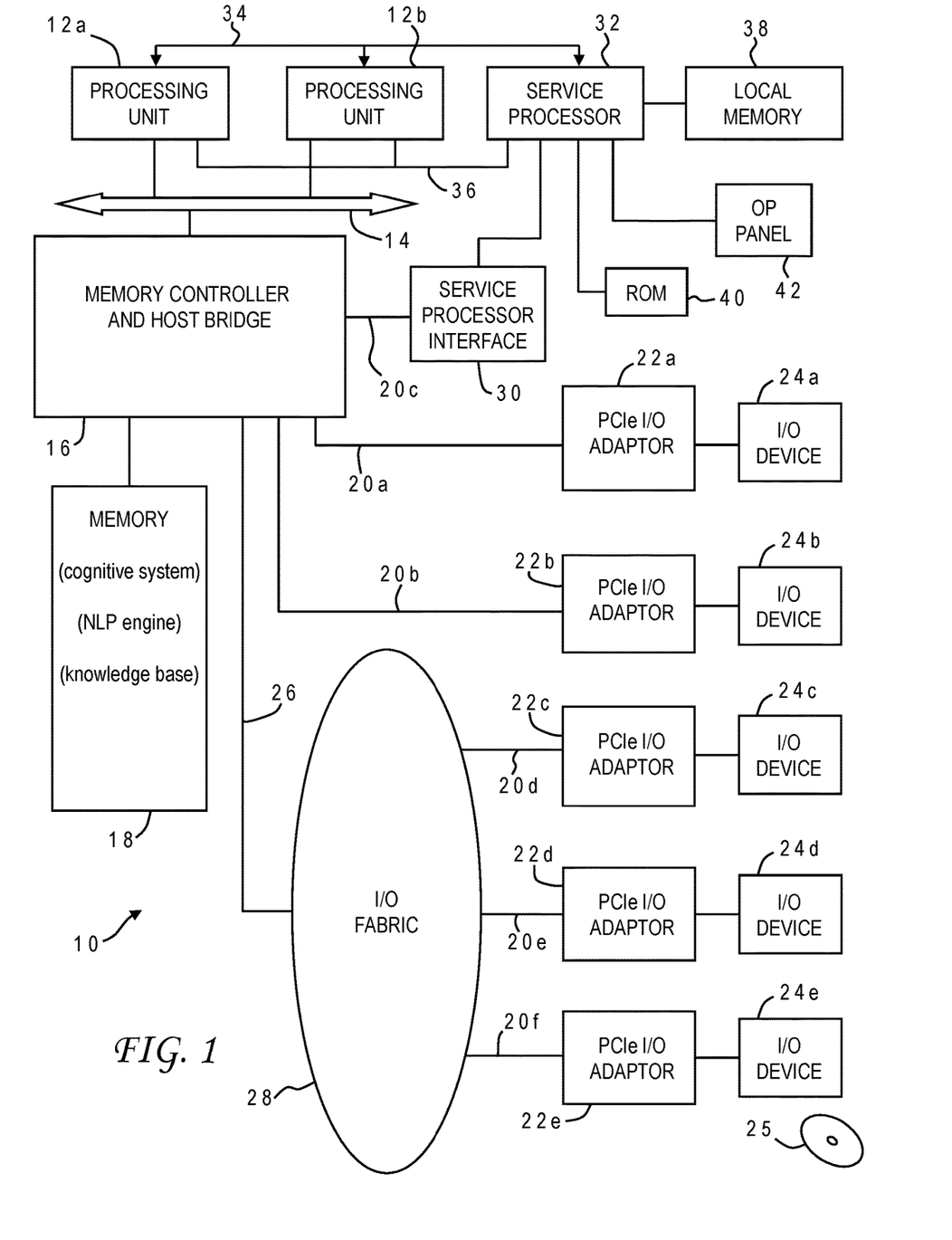
FIG. 1 is a block diagram of a computer system programmed to carry out cognitive analysis and natural language processing in accordance with one implementation of the present invention.

With reference now to the figures, and in particular with reference to FIG. 1, there is depicted one embodiment 10 of a computer system in which the present invention may be implemented to carry out the analysis of a natural language statement and correct an inaccurate relationship therein. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention such as a cognitive system, a natural language processing (NLP) engine, and a knowledge base.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20*c* connects MC/HB 16 to a service processor interface 30 to allow communications between I/O device 24*a* and a service processor 32. Service processor 32 is connected to processors 12*a*, 12*b* via a JTAG interface 34, and uses an attention line 36 which interrupts the operation of processors 12*a*, 12*b*. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12*a*, 12*b* and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12*a*, 12*b* for execution of the program code, e.g., an operating system (OS) which is used to launch applications and in particular the cognitive natural language process of the present invention, results of which may be stored in a hard disk drive of the system (an I/O device 24). While host processors 12*a*, 12*b* are executing program code, service processor 32 may enter a mode of monitoring and reporting any operating parameters or errors, such as the cooling fan speed and operation, thermal sensors, power supply regulators, and recoverable and non-recoverable errors reported by any of processors 12*a*, 12*b*, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a natural language process that uses novel cognitive analysis techniques to correct inaccurate relationships in a natural language statement. Accordingly, a program embodying the invention may additionally include conventional aspects of various NLP tools, and these details will become apparent to those skilled in the art upon reference to this disclosure.

Figure 2:
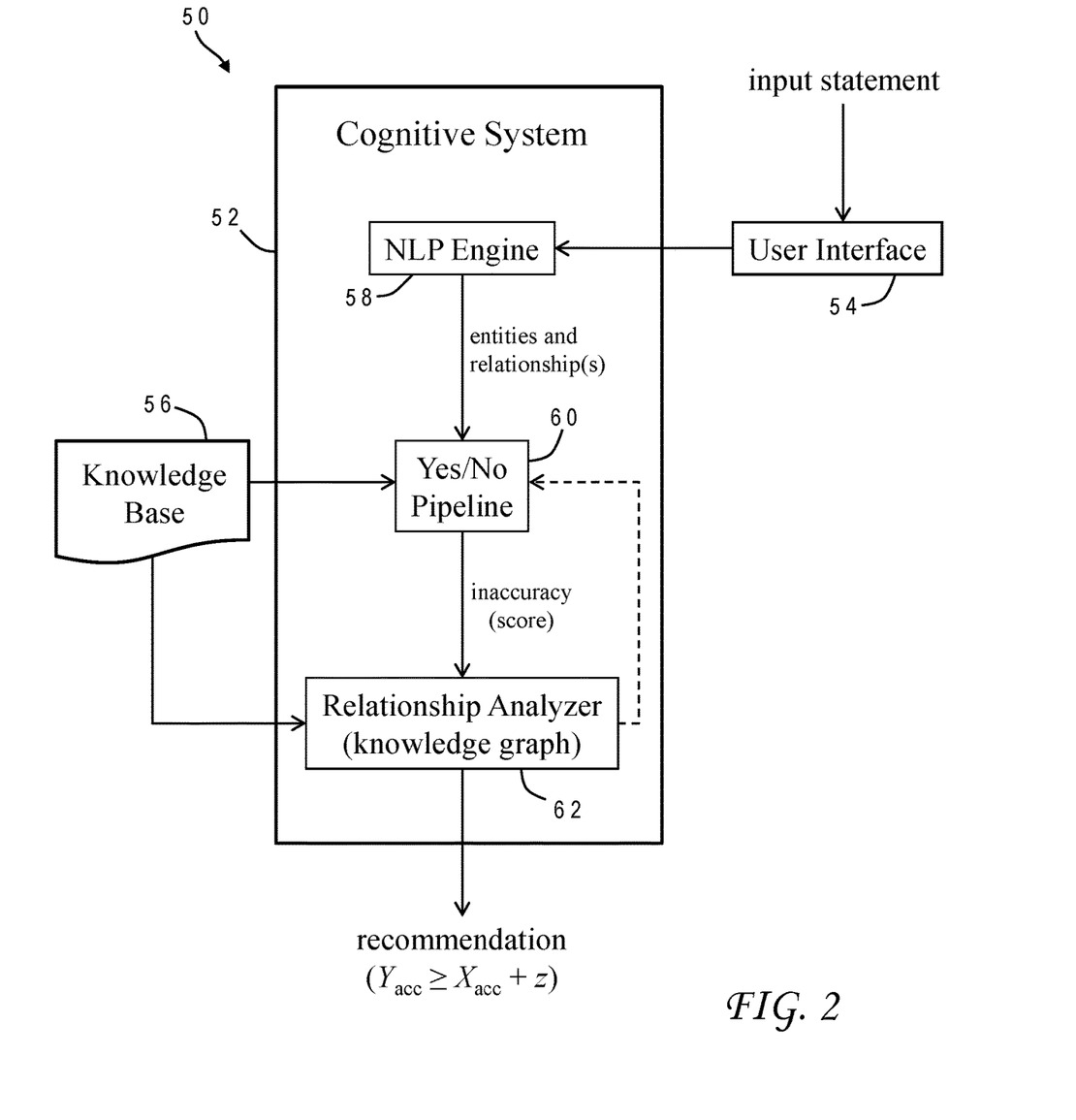
FIG. 2 is a high-level block diagram of a cognitive system constructed in accordance with one implementation of the present invention which uses a knowledge base and relationship analyzer to provide a recommended change to a statement to increase its accuracy.

Referring now to FIG. 2, there is depicted a high-level block diagram of a cognitive environment 50 in accordance with one implementation of the present invention. Cognitive environment 50 includes a cognitive system 52, a user interface 54 for receiving natural language statements (or queries) from a human user, and a knowledge base 56. All of these components 52, 54, 56 may reside on a single system such as computer system 10, or may be distributed. In an example of a distributed system, user interface 54 is located at a client system operated by the user, cognitive system 52 is implemented as a cloud service by a first service provider and connected to user interface 54 via a network, and knowledge base 56 is provided by a second service provider via the Internet. Other variations of these and additional components may be deployed so these examples should not be construed in a limiting sense.

In this implementation cognitive system 52 has a natural language processing (NLP) engine 58, a yes/no pipeline 60, and a relationship analyzer 62. NLP engine 58 receives an input statement from the user via user interface 54, and extracts various entities and relationships from the statement using conventional NLP techniques. These techniques may include a text analysis in which a text annotator program analyzes words and phrases in the statement relative to a defined set of tags. The text annotator can generate linguistic annotations within the document to tag concepts and entities that might be buried in the text. Cognitive system can then use a set of linguistic, statistical and machine-learning techniques to parse the annotated text, and extract key information such as person, location or region, organization, particular object (e.g., a vehicle or animal), etc., and relationships between these entities.

The parsed text is passed through yes/no pipeline 60 which uses the information contained in knowledge base 56 to make a determination of whether the statement is accurate according to conventional cognitive methods. If the statement is found by yes/no pipeline 60 to be generally true, cognitive system 52 will not recommend any changes to the statement. However, if the statement is found to be inaccurate, it is passed to relationship analyzer 62. In some implementations yes/no pipeline 60 computes a numeric value which represents the accuracy of the statement. This accuracy score may be a reflection of the confidence value(s) generated by the cognitive system in examining the text. For example, the score might be in a range of zero to one hundred, where zero represents complete inaccuracy or falsehood, and one hundred represents complete accuracy or truth. The accuracy score is for the overall accuracy of the statement, not for any singular feature thereof.

In such an implementation yes/no pipeline 60 can be calibrated by the designer by setting a threshold (programmable) value which determines how aggressive the system can be at proposing re-workings of a statement. If the threshold is set fairly high, e.g., at 90, then yes/no pipeline will only consider a statement to be true if its accuracy score is 90 or higher, resulting in the system being very aggressive about offering corrections, but if the threshold is set fairly low, e.g., at 10, then any accuracy score of 10 or above will result in the system accepting the truth of the statement, making it very hesitant to offer corrections.

Relationship analyzer 62 examines the various entities in the statement to find any predominant relationships therebetween. This analysis may include the use of knowledge graphs derived from knowledge base 56 as described further below in conjunction with FIGS. 3 and 4, along with conventional techniques such as those used by the NLP engine to identify relationships between entities in a statement, only now these techniques are applied to the statements making up the knowledge base. Relationship analyzer 62 can scan text in knowledge base 56 for any co-occurrences of entities from the input statement (i.e., two or more of the entities appearing in a particular sentence), and examine any such co-occurrences to establish a relationship. For any given pair of entities for whom a relationship is found, relationship analyzer 62 identifies a candidate phrase from the knowledge base to represent the relationship, and further determines a target phrase within the original statement which represents some other relationship (whether true or false) between the same two entities. Relationship analyzer 62 tentatively substitutes the candidate phrase for the target phrase and feeds this modified statement back to yes/no pipeline 60 to gauge its accuracy. If the modified statement is deemed true by the pipeline, then it can be offered to the user as a recommendation. Multiple candidate phrases can be processed in this manner (i.e., there can be multiple predominant relationships), and all of those found to be accurate can be presented to the user.

In some implementations cognitive system 52 is further tuned depending on what level of assertiveness is desired in correction recommendation, by requiring that the accuracy score of the modified statement be greater than the accuracy score of the input statement by some specified amount. This predetermined tuning factor can be set low if more suggestions are desired (even if they are wrong), or set high to squelch candidate results. For example, in the previous implementation where the accuracy scores range from zero to one hundred, the tuning factor might be 20. In this case an input statement having an accuracy score of, say, 50, will not be corrected unless a modified statement is found by the relationship analyzer whose accuracy score is at least 70, i.e., when $$Y_{acc} \geq X_{acc} + z$$

where $Y_{acc}$ is the accuracy score of the modified statement, $X_{acc}$ is the accuracy score of the input statement, and z is the tuning factor. The tuning parameter can and should be different depending on the particular use; if someone is doing, say, document discovery and want lots of suggestions (even if many of them are wrong), they can set the tuning parameter low, but if their use case involves something serious or irrevocable they might want the parameter higher.

Figure 3:
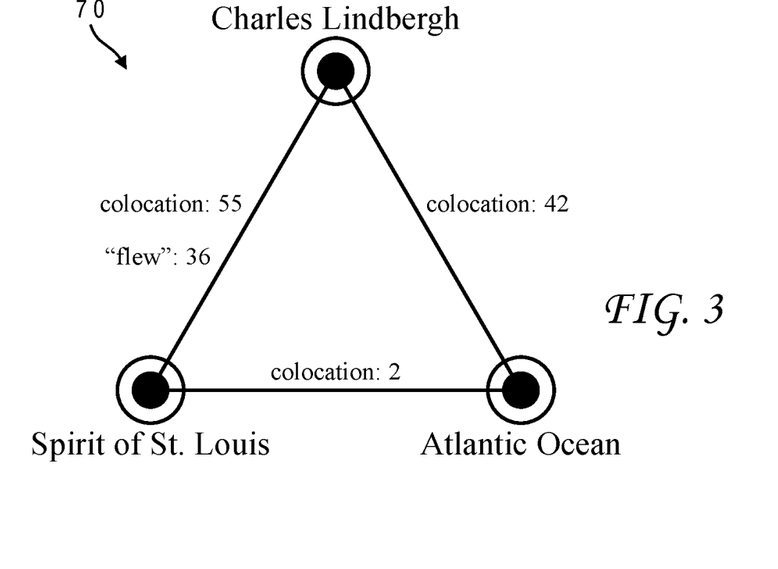
FIG. 3 is a knowledge graph for an example statement indicating possible relationships between three entities in the statement in accordance with one implementation of the present invention.
Figure 4:
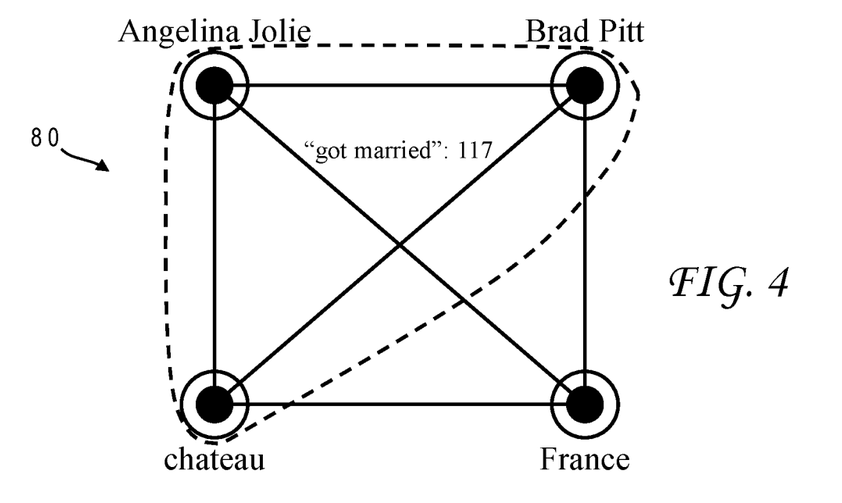
FIG. 4 is another knowledge graph for another example statement indicating possible relationships between four entities in the statement in accordance with one implementation of the present invention.

Two exemplary knowledge graphs constructed in accordance with the present invention are shown in FIGS. 3 and 4. A knowledge graph as used herein includes vertices (nodes) variously connected by edges (lines). In this application the vertices represent entities and the edges represent relationships between interconnected entities. FIG. 3 shows a knowledge graph 70 constructed by relationship analyzer 62 when considering the input statement "Charles Lindbergh sailed the Spirit of St. Louis across the Atlantic Ocean". NLP engine 58 identifies three entities in this statement, "Charles Lindbergh", "Spirit of St. Louis" and "Atlantic Ocean". Relationship analyzer 62 scans the knowledge base for colocations of respective pairs of these entities, finding 55 sentences that include both "Charles Lindbergh" and "Spirit of St. Louis", 42 sentences that include both "Charles Lindbergh" and "Atlantic Ocean", and two sentences that include both "Spirit of St. Louis" and "Atlantic Ocean". Relationship analyzer 62 analyzes each of these colocations to identify corresponding relationships between the respective pairs, and in particular finds 36 instances where the relationship between "Charles Lindbergh" and "Spirit of St. Louis" is some form of the word "flew". This relationship is predominant for this pair of entities, i.e., it has more colocations than any other relationships, or is otherwise statistically significant in terms of variance, median, etc. Relationship analyzer 62 accordingly considers using this term as a replacement in the input statement. Relationship analyzer 62 examines the input statement to identify a target phrase representing the relationship between these same two entities ("Charles Lindbergh" and "Spirit of St. Louis") and comes up with "sailed", so the recommendation is to substitute the candidate phrase "flew" for "sailed". The resulting modified statement "Charles Lindbergh flew the Spirit of St. Louis across the Atlantic Ocean" is fed back to yes/no pipeline 60 which confirms its accuracy, so this modified statement is then presented to the user as a recommended correction. If there are many relationships to test, the candidate statements could run through the yes/no pipeline in parallel for speed purposes.

While this implementation has relationship analyzer 62 automatically constructing the knowledge graph, it could alternatively be constructed semi-automatically (with human assistance), or even manually provided to the system.

FIG. 4 shows with another example how the statement can have more than just three entities involved. In this example the user is testing the statement "Angelina Jolie and Brad Pitt got divorced at a chateau in France". As it turns out, these two individuals were divorced in Los Angeles, so the statement is found to be false. The corresponding knowledge graph 80 shows four entities, "Angelina Jolie", "Brad Pitt", "chateau" and "France". Relationship analyzer 62 will use knowledge base 56 to derive relationships between respective pairs of these entities. It can further search for any relationships between more than two entities, e.g., a relationship that involves all three of "Angelina Jolie", "Brad Pitt" and "chateau" as indicated by the dashed line in FIG. 4. The resulting analysis finds that the predominant relationship involving these entities is "got married", which is suggested as a replacement for "got divorced", leading to the modified statement "Angelina Jolie and Brad Pitt got married at a chateau in France" which is then found to be true, and so offered as a recommended correction.

Those skilled in the art will appreciate that there are endless examples of how the knowledge graphs can be constructed. There could also be as little as two entities in a statement. Importantly, the present invention offers recommendations which swap out relationships, as opposed to entities. For example, a conventional correction system might offer the statement "Angelina Jolie and Brad Pitt got divorced in Los Angeles" as a substitute, but this modification only involves changes in entities, not in any relationship.

Figure 5:
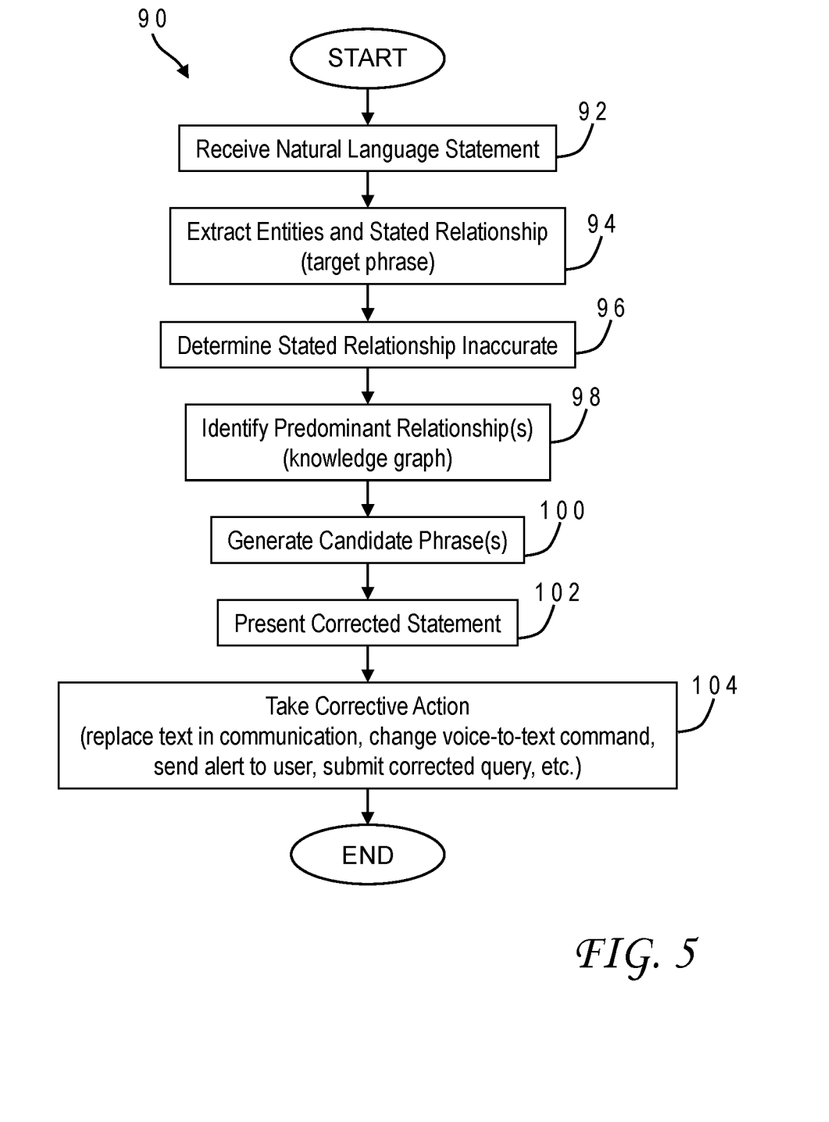
FIG. 5 is a chart illustrating the logical flow for a cognitive process to increase the accuracy of a statement in accordance with one implementation of the present invention.

The present invention may be further understood with reference to the chart of FIG. 5 which illustrates the logical flow for a cognitive process 90 to increase the accuracy of a statement in accordance with one implementation of the present invention. Process 90 may be carried out on computer system 10, and begins by receiving the natural language statement under test (92). Entities and relationships are extracted from the natural language statement (94), with a target phrase associated with a particular stated relationship. The particular relationship is determined to be inaccurate (96). The knowledge base is consulted to identify some other predominant relationship between the relevant entities (98), and generate a candidate phrase for the predominant relationship (100). A proposed corrected statement substituting the candidate phrase for the target phrase is presented to the user (102). More than one recommendation may be presented if multiple relationships are found each of which are found to be relatively accurate. Appropriate action may then be taken depending on the application (104). For example, if the statement is a query intended for submission to a deep question answering system (e.g., an Internet search engine), the query can be altered and then submitted to the system. In another implementation the invention is used to scan outgoing communications such as emails for misleading or unclear statements, and corrects those. In yet another implementation the invention is embodied in a tool that identifies errors in social media posts so they can be brought to the attention of the poster. A news media outlet could use an embodiment which fact checks statements by business or government representatives. In yet another implementation the invention can be used to interpret voice commands given to a smart-speaker (cognitive system), e.g., the system could say to the user "I know you told me 'I shove the Beatles', but I'm going to interpret that as 'I *love* the Beatles', and will play more of their music".

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of improving the accuracy of a natural language statement comprising:
receiving the natural language statement from a user in computer-readable form, by executing first instructions in a computer system;
extracting from the natural language statement a plurality of entities and at least one stated relationship using a natural language processing engine including a machine learning model, wherein the stated relationship is between at least a first one of the entities and a second one of the entities and is based on a target phrase in the statement, by executing instructions in the computer system;
determining that the natural language statement is inaccurate, by executing third instructions in the computer system, based, at least in part, on a first numeric accuracy score representing an overall accuracy of the natural language statement;
identifying a predominant relationship between the first and second entities using a knowledge base wherein the predominant relationship is different from the stated relationship, by executing fourth instructions in the computer system;
generating a candidate phrase representing the predominant relationship using natural language processing, by executing fifth instructions in the computer system;
computing a second numeric accuracy score representing an overall accuracy of the candidate statement, by executing instructions in the computer system;
establishing that the second numeric accuracy score is greater than a sum of the first numeric accuracy score and a predetermined tuning value, by executing instructions in the computer system; and
presenting the candidate phrase to the user as a suggested replacement for the target phrase in the natural language statement, by executing instructions in the computer system.

2. The method of claim 1 wherein said identifying includes:
constructing a knowledge graph using the knowledge base wherein the knowledge graph includes a plurality of vertices representing the entities in the natural language statement and a plurality of edges representing relationships between the entities; and
the predominant relationship is based on a statistically significant number of occurrences of a candidate relationship along a particular one of the edges of the knowledge graph, where statistically significant corresponds to more colocations of the predominant relationship than any other relationships.

3. The method of claim 1 wherein:
said identifying identifies multiple predominant relationships between the first and second entities;
said generating generates multiple candidate phrases representing the multiple predominant relationships; and
said presenting presents the multiple candidate phrases to the user as suggested replacements for the target phrase in the natural language statement.

4. The method of claim 1 wherein said first numeric accuracy score is computed using a yes/no pipeline which uses cognitive analysis of the natural language statement based on information contained in the knowledge base.

5. The method of claim 4 wherein:
the natural language statement is determined to be inaccurate when the numeric accuracy score is below a programmable threshold.

6. The method of claim 1 wherein the natural language statement is a query for submission to a deep question answering system, and further comprising:
automatically replacing the target phrase in the natural language statement with the candidate phrase to form a modified statement; and
submitting the modified statement to the deep question answering system.

7. A computer system comprising:
one or more processors which process program instructions;
a memory device connected to said one or more processors; and
program instructions residing in said memory device for improving the accuracy of a natural language statement by:
receiving the natural language statement from a user in computer-readable form,
extracting from the natural language statement a plurality of entities and at least one stated relationship using a natural language processing engine including a machine learning model, wherein the stated relationship is between at least a first one of the entities and a second one of the entities and is based on a target phrase in the statement,
determining that the natural language statement is inaccurate, based, at least in part, on a first numeric accuracy score representing an overall accuracy of the natural language statement,
identifying a predominant relationship between the first and second entities using a knowledge base wherein the predominant relationship is different from the stated relationship,
generating a candidate phrase representing the predominant relationship using natural language processing,
computing a second numeric accuracy score representing an overall accuracy of the candidate phrase,
establishing that the second numeric accuracy score is greater than a sum of the first numeric accuracy score and a predetermined tuning value, and
presenting the candidate phrase to the user as a suggested replacement for the target phrase in the natural language statement.

8. The computer system of claim 7 wherein said program instructions further construct a knowledge graph using the knowledge base, the knowledge graph including a plurality of vertices representing the entities in the natural language statement and a plurality of edges representing relationships between the entities, and the predominant relationship is based on a statistically significant number of occurrences of a candidate relationship along a particular one of the edges of the knowledge graph, where statistically significant corresponds to more colocations of the predominant relationship than any other relationships.

9. The computer system of claim 7 wherein said program instructions identify multiple predominant relationships between the first and second entities, generate multiple candidate phrases representing the multiple predominant relationships, and present the multiple candidate phrases to the user as suggested replacements for the target phrase in the natural language statement.

10. The computer system of claim 7 wherein said first numeric accuracy score is computed using a yes/no pipeline which uses cognitive analysis of the natural language statement based on information contained in the knowledge base.

11. The computer system of claim 10 wherein the natural language statement is determined to be inaccurate when the numeric accuracy score is below a programmable threshold.

12. The computer system of claim 11 wherein said program instructions further generate a candidate statement by substituting the candidate phrase for the target phrase in the natural language statement.

13. The computer system of claim 7 wherein the natural language statement is a query for submission to a deep question answering system, and said program instructions further automatically replace the target phrase in the natural language statement with the candidate phrase to form a modified statement, and submit the modified statement to the deep question answering system.

14. A computer program product comprising:
a computer readable storage medium; and
program instructions residing in said storage medium for improving the accuracy of a natural language statement by:
receiving the natural language statement from a user in computer-readable form,
extracting from the natural language statement a plurality of entities and at least one stated relationship using a natural language processing engine including a machine learning model, wherein the stated relationship is between at least a first one of the entities and a second one of the entities and is based on a target phrase in the statement,
determining that the natural language statement is inaccurate, based, at least in part, on a first numeric accuracy score representing an overall accuracy of the natural language statement,
identifying a predominant relationship between the first and second entities using a knowledge base wherein the predominant relationship is different from the stated relationship,
generating a candidate phrase representing the predominant relationship using natural language processing,
computing a second numeric accuracy score representing an overall accuracy of the candidate phrase,
establishing that the second numeric accuracy score is greater than a sum of the first numeric accuracy score and a predetermined tuning value, and
presenting the candidate phrase to the user as a suggested replacement for the target phrase in the natural language statement.

15. The computer program product of claim 14 wherein said program instructions further construct a knowledge graph using the knowledge base, the knowledge graph including a plurality of vertices representing the entities in the natural language statement and a plurality of edges representing relationships between the entities, and the predominant relationship is based on a statistically significant number of occurrences of a candidate relationship along a particular one of the edges of the knowledge graph.

16. The computer program product of claim 14 wherein said program instructions identify multiple predominant relationships between the first and second entities, generate multiple candidate phrases representing the multiple predominant relationships, and present the multiple candidate phrases to the user as suggested replacements for the target phrase in the natural language statement.

17. The computer program product of claim 14 wherein said first numeric accuracy score is computed using a yes/no pipeline which uses cognitive analysis of the natural language statement based on information contained in the knowledge base.

18. The computer program product of claim 17 wherein the natural language statement is determined to be inaccurate when the numeric accuracy score is below a programmable threshold.

19. The computer program product of claim 18 wherein said program instructions further generate a candidate statement by substituting the candidate phrase for the target phrase in the natural language statement.

* * * * *